United States Patent
Hollingworth et al.

[11] Patent Number: 5,779,222
[45] Date of Patent: Jul. 14, 1998

[54] TAPERED PLUG VALVE

[75] Inventors: Keith Jeffrey Hollingworth; Peter Richard Jones, both of Telford, United Kingdom

[73] Assignee: BTR plc, London, United Kingdom

[21] Appl. No.: 750,036
[22] PCT Filed: Aug. 9, 1995
[86] PCT No.: PCT/GB95/01881
§ 371 Date: Nov. 27, 1996
§ 102(e) Date: Nov. 27, 1996
[87] PCT Pub. No.: WO96/05459
PCT Pub. Date: Feb. 22, 1996

[30] Foreign Application Priority Data

Aug. 12, 1994 [GB] United Kingdom ............ 9416307
Oct. 27, 1994 [GB] United Kingdom ............ 9421689
Nov. 17, 1994 [GB] United Kingdom ............ 9423235

[51] Int. Cl.⁶ .................................................. F16K 39/06
[52] U.S. Cl. ........................................ 251/283; 251/309
[58] Field of Search ................................. 251/283, 309

[56] References Cited

U.S. PATENT DOCUMENTS

| 749,005 | 1/1904 | Ward | 251/283 |
| 2,124,359 | 7/1938 | Weisgerber | 251/246.22 |
| 2,573,238 | 10/1951 | Wunn | 251/283 X |
| 2,707,613 | 5/1955 | Wheatley | 251/283 X |
| 2,815,766 | 12/1957 | Mueller | 251/283 X |
| 3,072,379 | 1/1963 | Hamer | 251/283 X |
| 3,288,432 | 11/1966 | Ferrin et al. | 251/283 X |
| 4,034,776 | 7/1977 | Eshghy | 251/283 X |
| 4,174,092 | 11/1979 | Macleod | 251/283 X |
| 4,614,330 | 9/1986 | Kalsi et al. | 251/283 |
| 5,150,735 | 9/1992 | Bandy et al. | 137/614.06 |

FOREIGN PATENT DOCUMENTS

| 2328905 | 5/1977 | France |
| 2116272 | 9/1983 | United Kingdom |

*Primary Examiner*—John Rivell
*Attorney, Agent, or Firm*—Watson Cole Stevens Davis, P.L.L.C.

[57] ABSTRACT

A tapered plug valve having a plug provided with a separate drive shaft and formed with a channel not connected to the plug but connecting the ends thereof to enable pressure equalization. The channel may be formed by being directly drilled through the plug, or comprise a tube, secured in position by welding in a groove cast in the outer surface of the plug. A non return valve is positioned in the channel to limit pressure equalization from the wider end to the smaller end of the plug.

5 Claims, 6 Drawing Sheets

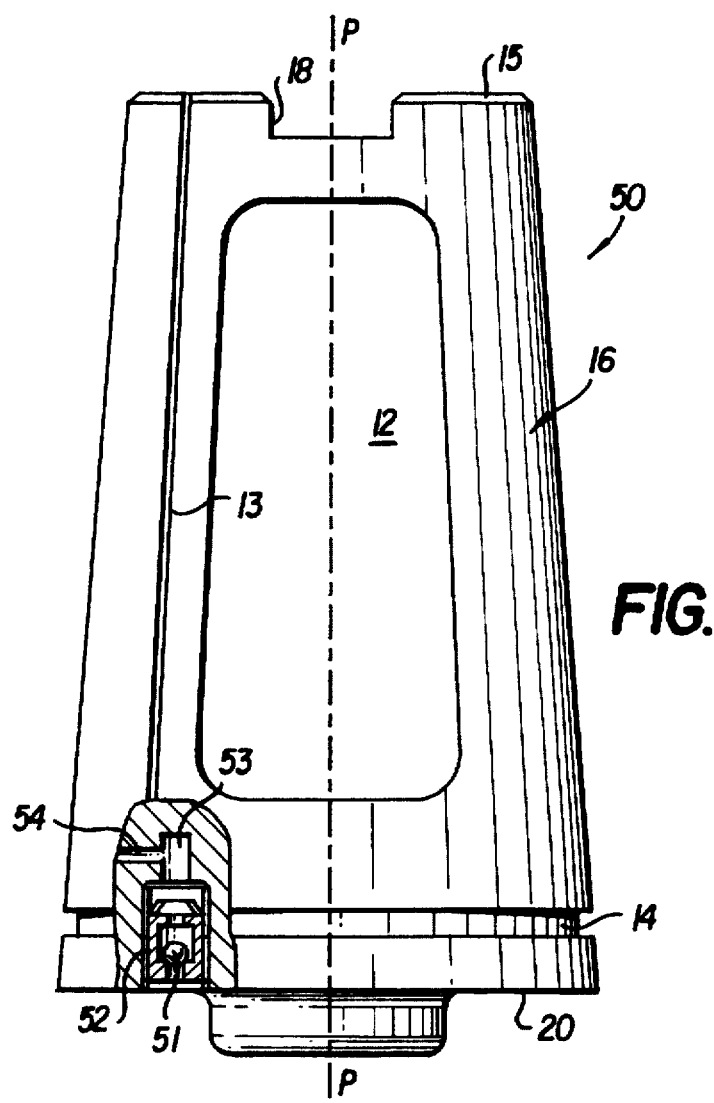
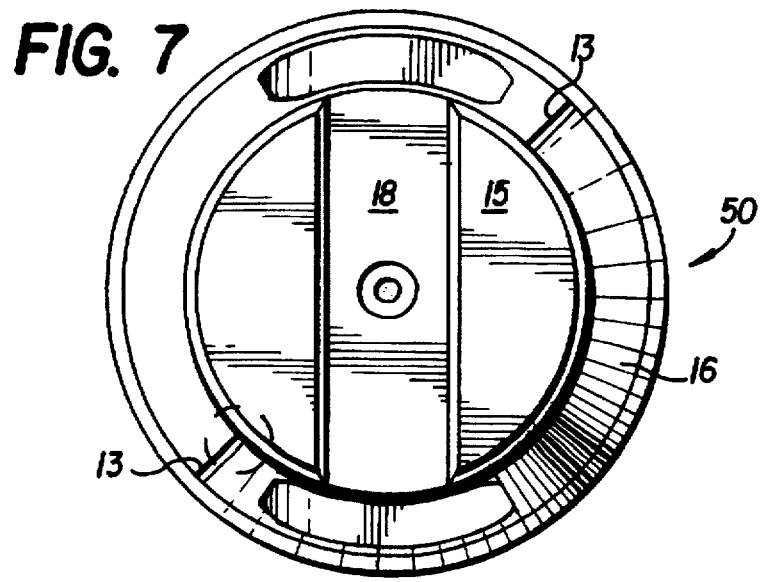

TAPERED PLUG VALVE

This invention relates to a tapered plug valve.

The plug of a so-called "pressure balanced" tapered plug valve is conventionally provided with two holes, one connecting the port in the plug to the wide end of the plug and the other connecting the port to the narrow end. This equalises the pressure at both ends of the plug to the line pressure of the line medium flowing through the valve. A non-return valve is often provided in the hole adjacent the narrow end, allowing flow of line medium from the port to the narrow end. Such a valve is disclosed in FR-A-2328905.

However it has been found that in some instances the line medium causes corrosion of the plug and/or deterioration of the lubricant/sealant. Further, if the line medium is dirty or abrasive, the holes can be blocked and/or the non-return valve become damaged, jammed or otherwise caused to malfunction.

U.S. Pat. No. 2,124,359 and U.S. Pat. No. 2,573,238 each disclose a tapered plug valve having a body, a tapered plug in a tapered bore in the body, a shaft which is separate from but drivably connected to the body and a duct in the plug connecting the wide and narrow ends thereof. However sometimes a momentary increase in pressure occurs at the wide end forcing the plug into the bore and causing it to become jammed.

It is an object of the present invention to provide a tapered plug valve which does not suffer from, or suffers less from these disadvantages.

In accordance with the invention a tapered plug valve comprises a body having a passageway therethrough for flow of medium, two chambers and a tapered bore intercepting said passageway, a tapered plug having an outer surface, a wide end and a narrow end rotatably located in the bore and adapted to block said passageway in a closed condition of the valve, one of the chambers being at the wide end of the plug and the other at the narrow end, and a shaft separate from but drivably connected to the plug to cause rotation thereof, the plug having a port adapted to be in communication with said passageway in an open condition of the valve and a channel which does not connect to the port but which connects the wide end to the narrow end to enable equalisation of pressure in the two chambers at the two ends of. the plug, characterised in that a non-return valve is positioned in the channel to allow pressure change and associated flow from the wide end towards the narrow end.

The non-return valve thus retains sealant/lubricant in the chamber at the narrow end. This non-return valve is more usually positioned adjacent the narrow end to minimise the volume of sealant/lubricant in the channel and the chamber at the narrow end but may be positioned adjacent the wide end. The pressure change is such that the pressure in the chamber at the wide end reduces and the pressure in the chamber at the narrow end increases until equalisation occurs. However, the pressure at the narrow end may be caused to be greater than that at the wide end thus creating an acceptable imbalance force which assists in preventing the plug from being jammed in the bore.

The channel connecting the wide end to the narrow end may be formed by being directly drilled through the plug, avoiding connection with the port. Alternatively, the channel may be formed by casting a longitudinal groove in the outer surface of the plug and then securing e g by welding, a cylindrical tube in position in the groove. Further alternatively, the channel may comprise a groove formed in the outer surface of the plug and which also carries sealant/lubricant to provide a film between the tapered i e conical, outer surface of the plug and the facing interior surface of the bore.

Five embodiments of the invention will now be described by way of example only with reference to the accompanying drawings of which:

FIG. 6 shows a side view, partially in section, of a plug of a tapered plug valve according to a third embodiment of the invention;

FIG. 7 shows a top plan view of the plug shown in FIG. 6;

Figure 1:
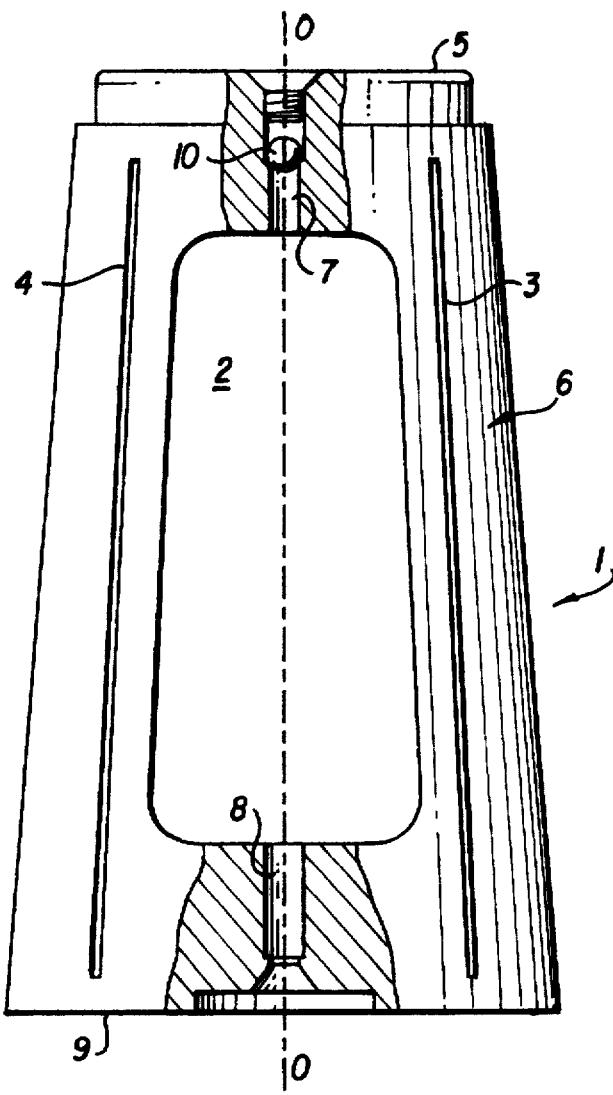
FIG. 1 shows a side view, partially in section of a plug of a known tapered plug valve.

As shown in FIG. 1, the known plug valve comprises a tapered plug 1 which fits into the correspondingly shaped bore of a valve body (not shown). The tapered plug has a port 2 through which line medium may flow, and two longitudinal grooves 3,4 formed on the outer surface 6 of the plug to carry sealant/lubricant to the inner surface of the bore against which the plug seats. However the grooves do not extend to each end of the plug. A drive shaft (not shown) is provided at the narrow end 5 at the top of the plug. In use this shaft causes the plug to rotate about the axis O—O between open and closed positions. The plug is provided with two holes 7,8, one hole 7 leading from the narrow end 5 at the top of the plug to the port 2 and the other hole 8 leading from the wide end 9 at the bottom of the plug to the port 2. A non-return valve 10, to prevent flow from the space at the top of the plug towards the port is provided in the upper hole 7. The two holes 7,8 allow the pressure in the spaces in the valve body above and below the plug to be made equal to the pressure of the line medium and prevents the plug moving axially away from its seat on the bore if the line pressure varies suddenly.

However, the non-return valve 10 may become damaged, jammed or otherwise caused to malfunction if the line medium is corrosive or carries dirt e.g. small particles of grit.

Figure 2:
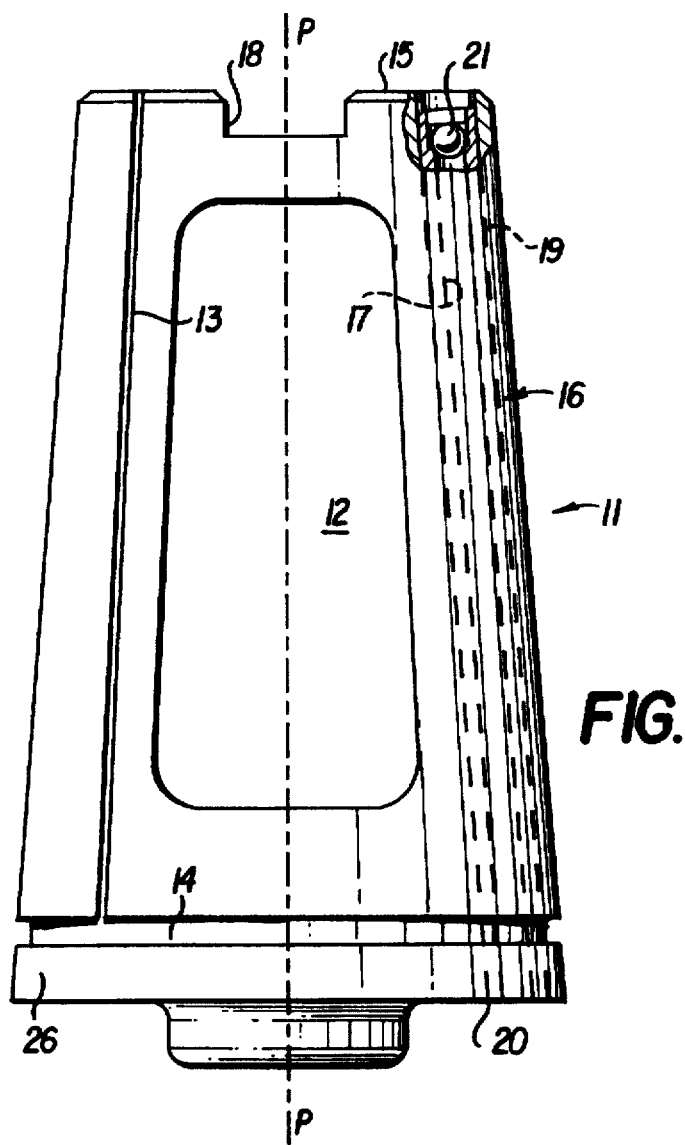
FIG. 2 shows a side view, partially in section, of a plug of a tapered plug valve according to a first embodiment of the invention.
Figure 3:
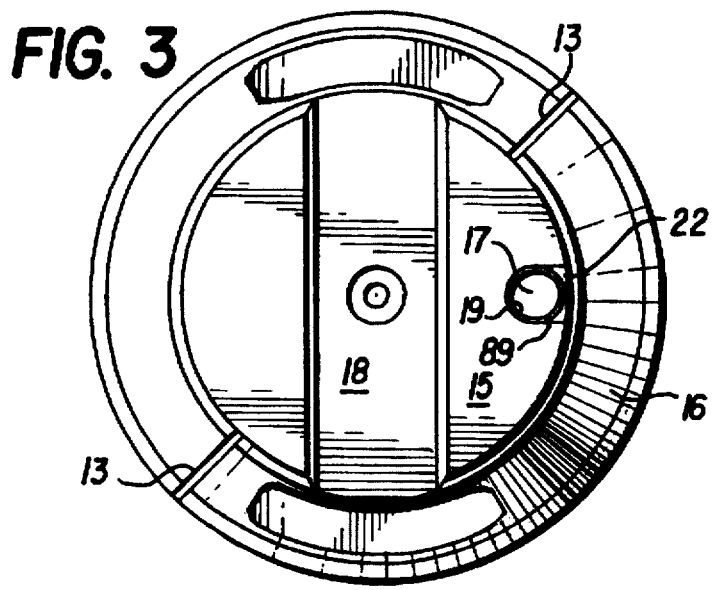
FIG. 3 shows a top plan view of the plug shown in FIG. 2.

The first embodiment of the invention, shown in FIGS. 2 and 3, comprises a tapered plug valve having a tapered plug 11 which fits into the correspondingly-shaped bore of a valve body (not shown). The tapered plug 11 has a port 12, two longitudinal grooves 13 and a circumferential groove 14 formed on the conical outer surface 26 of the plug to carry sealant/lubricant to the inner surface of the bore against which the plug seats. The circumferential groove 14 is positioned near to, but spaced apart from, the wide end 20 of the plug, and the two longitudinal grooves, 13, one diametrically opposed to the other (see FIG. 3) extend from the circumferential groove to the narrow end 15 of the plug. A drive shaft (not shown) has a shaped end which fits in a rectangular cross-section recess 18 at the narrow end 15 at the top of the plug and in use, rotates the plug 11 about the axis P—P between open and closed positions.

The plug is provided with a channel 17 formed by casting a wide groove 89 having parallel sides and a semi-cylindrical base on the outer surface 16, the groove extending all the way from the narrow end 15 to the wide end 20 of the plug. A circular cross-section tube 19 is positioned in the base of the wide groove 89, the outer diameter of the tube matching the internal diameter of the groove base, and welded in position, the welding alloy 22 filling the remainder of the wide groove 89. The tube axis is generally parallel to the outer conical surface 16. The channel 17 is positioned between the port 12 and the outer surface 16 so as not to communicate with either.

Adjacent the small end 15 at the top of the plug the tube 19 is provided with a non-return valve 21, thus allowing pressure change and associated flow from the wide end 20 at the bottom to the narrow end 15 at the top but not in the reverse direction, with the result that pressure equalisation in the chambers at the top and bottom ends occurs. However, because of the presence of the valve 21, the pressure in the chamber at the top i.e. the narrow end of the plug, may be momentarily greater than the pressure in the lower chamber i.e. at the bottom, wide end of the plug, but this pressure will relieve due to the resultant plug movement. The channel 17 through the tube 19 allows the pressure at the top end of the plug to be equalised automatically to that at the wide end 20. However, since there is no communication between the non-return valve and the port 12, it cannot be damaged, jammed or otherwise caused to malfunction by the line medium or dirt carried thereby.

Figure 4:
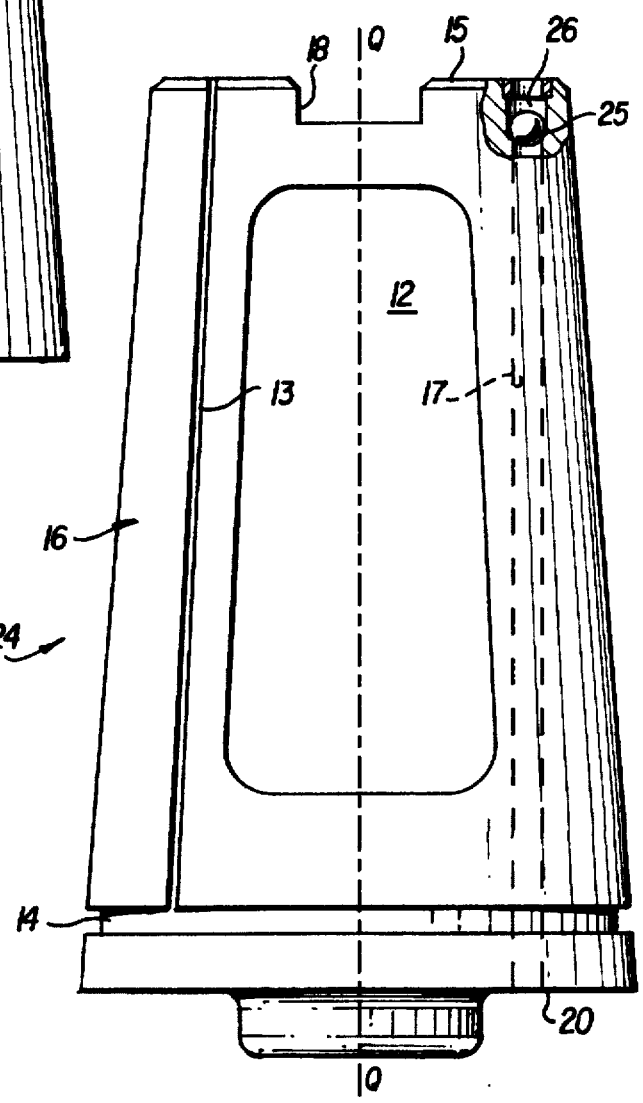
FIG. 4 shows a side view, partially in section, of a plug of a tapered plug valve according to a second embodiment of the invention.

The second embodiment of the invention, shown in FIG. 4, comprises a tapered plug valve having a plug 24 with many features which are the same as the plug of the first embodiment. The features which are the same have been given the same numerals in FIG. 4 as in FIG. 2, and will not be described again.

The plug of this embodiment has a channel 17 formed by drilling a hole all the way through the plug from the narrow end at the top to the wide end at the bottom, the axis of the hole being parallel to the rotational axis Q—Q of the plug. The hole lies between the port and the conical outer surface of the plug and does not communicate with either. Adjacent the narrow end of the hole is positioned a non-return valve 25, seated in a widened portion 26 of the hole. In use flow may take place from the wide end 20 of the plug to the narrow end 15 to equalise the pressure.

Figure 5:
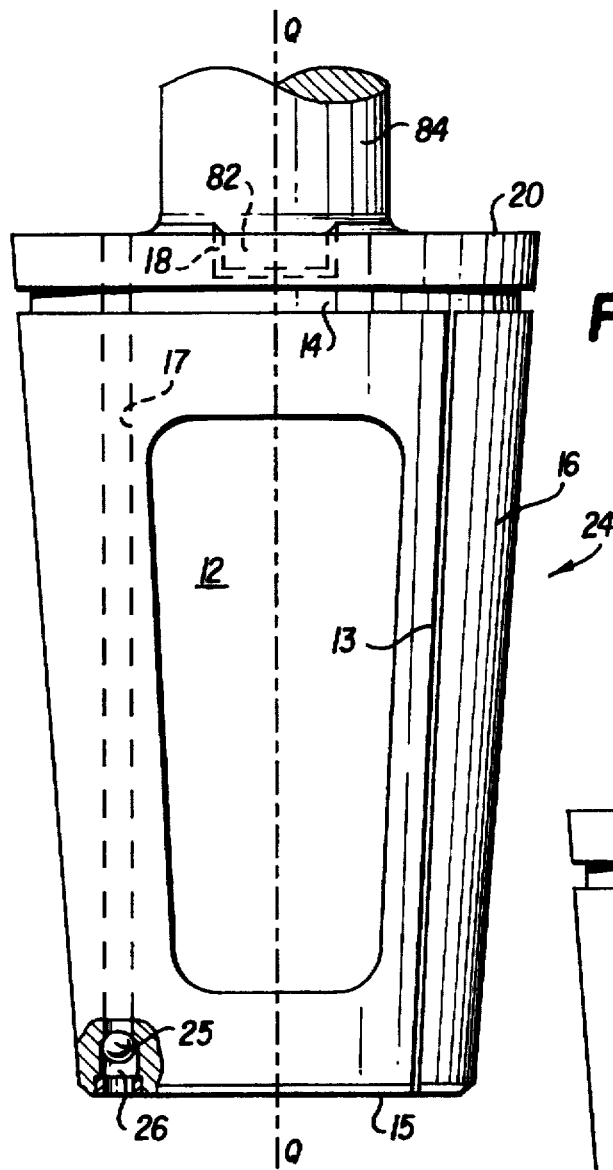
FIG. 5 shows a side view, partially in section, of a plug of a tapered plug valve according to a modification of the second embodiment of the invention.

A modification of the second embodiment is shown in FIG. 5. A drive shaft 84 is connected to the plug at its wide end by a shaped tongue 82 fitting in a rectangular recess 18. The plug (and the bore) is inverted with respect to the construction shown in FIG. 4, the wide end now being at the top and the narrow end at the bottom. In all other respects the plug (and bore) is the same.

Figure 8:
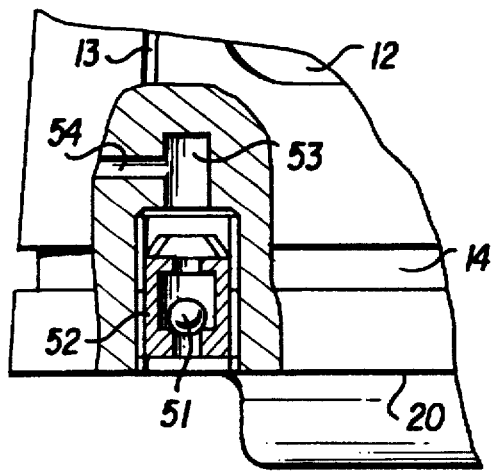
FIG. 8 shows an enlargement of part of the view shown in FIG. 6.

The third embodiment of the invention, shown in FIGS. 6, 7 and 8, comprises a tapered plug valve having a plug 50 which fits into the correspondingly-shaped bore of a valve body (not shown). Like the plug of the first embodiment, the plug 50 has a port 12, two longitudinal grooves 13 and a circumferential groove 14. A non-return valve 51 is located in a screw-threaded bore 52 situated at the wide end of the plug. The base of the bore is formed with a hole 53 extending parallel to the rotational axis P—P of the plug and this hole is connected by a further hole 54 extending radially of the axis P—P to one of the longitudinal grooves 13. Thus a connection is made from the wide end to the narrow end of the plug via the screw-threaded bore 52, the hole 53, the further hole 54 and the groove 13, and pressure equalization between the two ends is allowed to occur.

Alternatively, the position and configuration of the bore, the hole and the further hole may be such that connection is made to the circumferential groove 14, thus allowing pressure equalization to occur from the wide end to the narrow end of the plug via both longitudinal grooves 13 and the circumferential groove 14.

Figure 11:
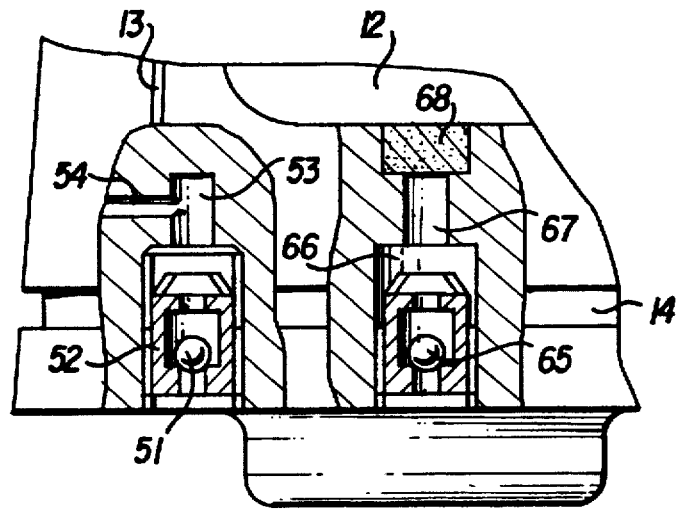
FIG. 11 shows an enlargement of part of the view shown in FIG. 10.
Figure 9:
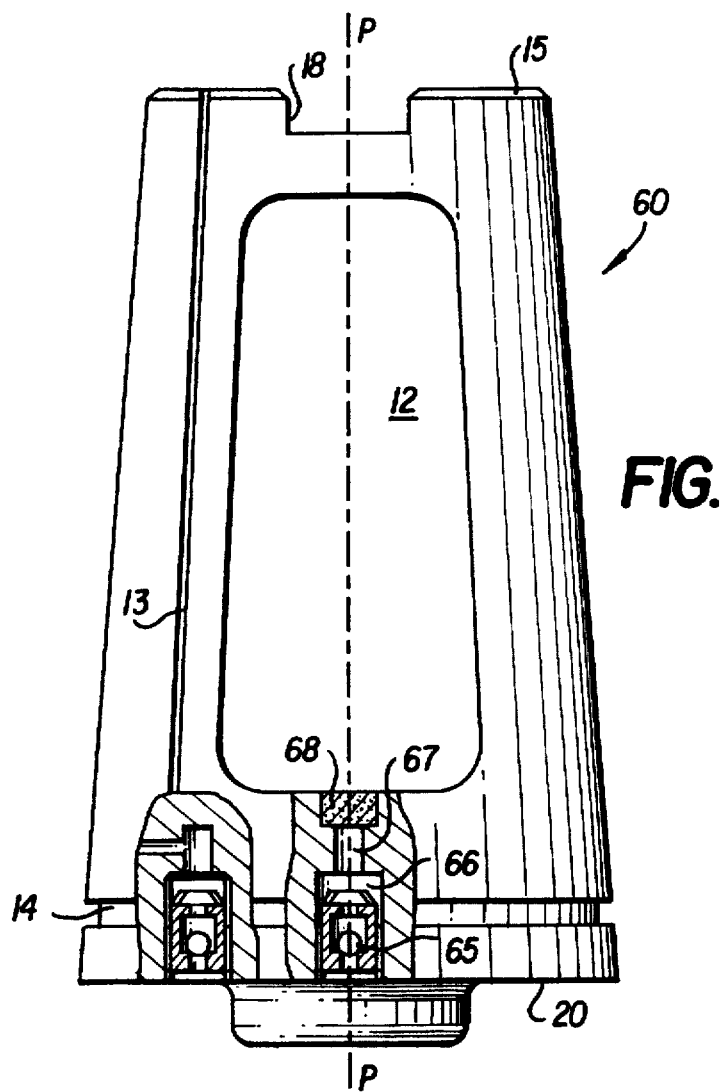
FIG. 9 shows a side view, partially in section of a plug of a tapered plug valve according to a fourth embodiment of the invention.
Figure 10:
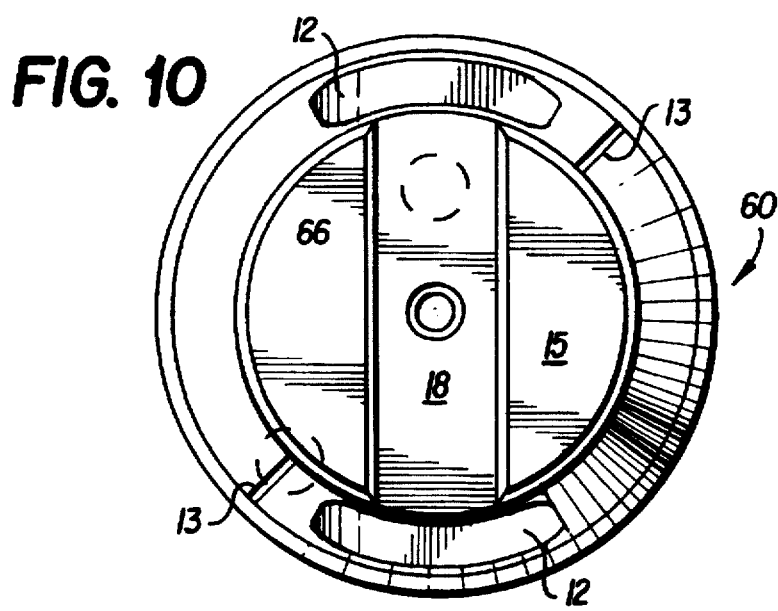
FIG. 10 shows a top plan view of the plug shown in FIG. 9.

The plug 60 of the valve of the fourth embodiment of the invention shown in FIGS. 9, 10 and 11 has all the features of the valve of the fourth embodiment. However, as can be seen particularly in FIGS. 9 and 11, an additional non-return valve 65 is located in a screw-threaded bore 66 at the wide end of the plug and a passage 67, preferably having a filter 68 therein, connects the bore to the port. Thus pressure equalization between the port and the wide end is allowed to occur.

Figure 12:
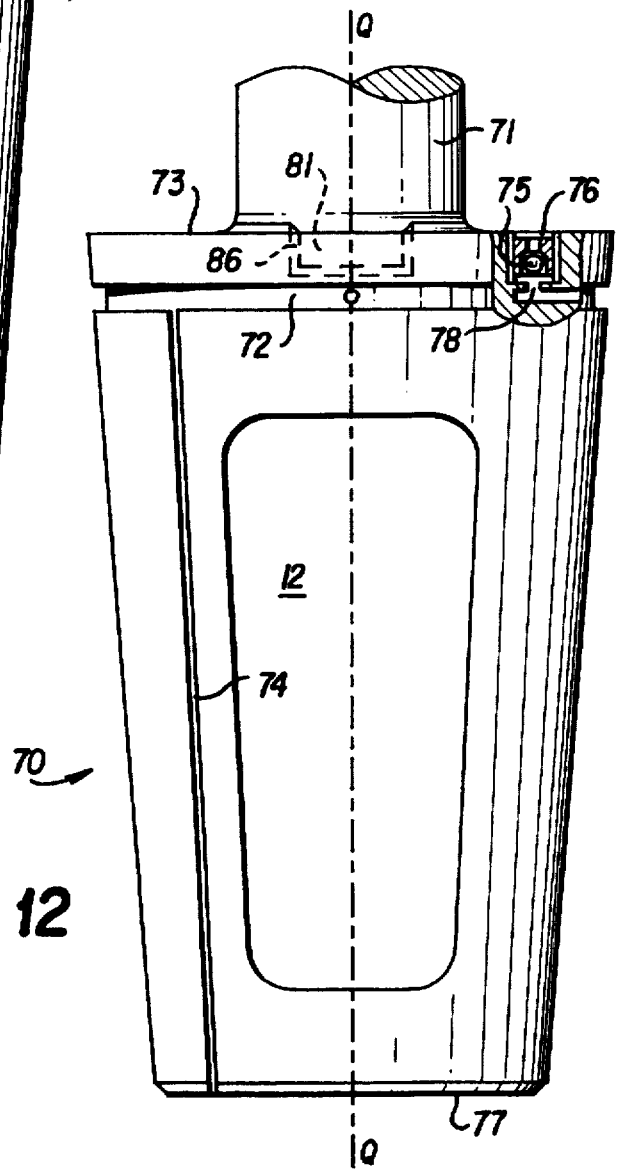
FIG. 12 shows a side view, partially in section, of a plug of a tapered plug valve according to a fifth embodiment of the invention.

The valve of the fifth embodiment of the invention has a plug 70 (shown in FIGS. 12 and 13) which has a shaft 71 connected thereto by means of a shaped tongue 88 fitting in a rectangular recess 86 at the wide end. A circumferential sealant/lubricant carrying groove 72 is provided a small distance from the wide end 73 and two sealant/lubricant carrying longitudinal grooves 74 (only one shown) diametrically disposed with respect to each other and to the rotational axis Q—Q of the plug connect the circumferential groove to the narrow end 77 of the plug 70.

Figure 13:
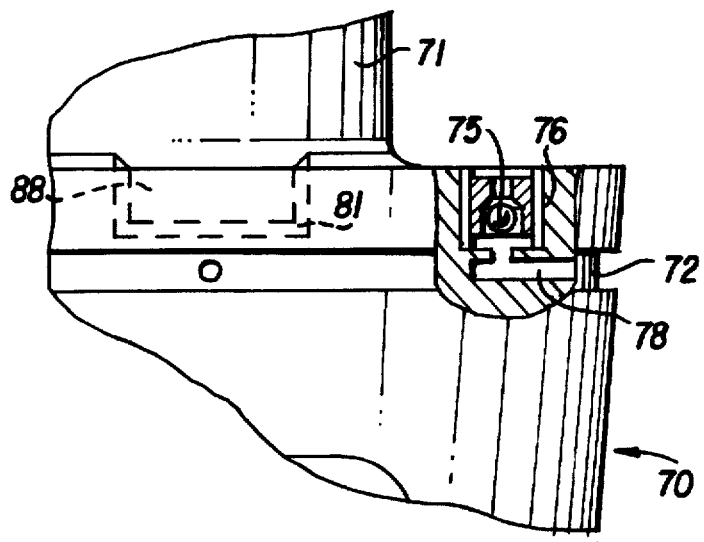
FIG. 13 shows an enlargement of part of the view shown in FIG. 12.

A non-return valve 75 is located in a bore 76 at the wide end and a passageway 78 connects the base of the bore to the circumferential groove 72 as shown particularly in FIG. 13, (or to one of the two longitudinal grooves). Thus a channel connecting the wide end at the top of the plug to the narrow end at the bottom is provided by the bore 76, the passageway 78, the circumferential groove 72 and the two longitudinal grooves, thus allowing pressure equalization to occur.

We claim:

1. A tapered plug valve comprising
   a body having a passageway therethrough for flow of medium, two chambers and a tapered bore intercepting said passageway;
   a tapered plug having an outer surface, a wide end and a narrow end rotatably located in the bore and adapted to block said passageway in a closed condition of the valve, one of the chambers being at the wide end of the plug and the other at the narrow end; and
   a shaft separate from but drivably connected to the plug to cause rotation thereof,
   the plug having a port adapted to be in communication with said passageway in an open condition of the valve, and a channel which does not connect to the port but which connects the wide end to the narrow end to enable equalization of pressure in the two chambers at the two ends and
   a non-return valve positioned in the channel to allow pressure change and associated flow from the wide end towards the narrow end.

2. A tapered plus valve according to claim 1 in which the non-return valve is positioned adjacent the narrow end.

3. A tapered plug valve according to claim 1 in which the channel is formed by being directly drilled through the plug, avoiding connection with the port.

4. A tapered plug valve according to claim 1 in which the channel comprises a groove formed on the outer surface of the plug.

5. A tapered plug valve according to claim 1 in which the channel is formed by casting a longitudinal groove in the outer surface of the plug and then securing a tube in position in the groove.

* * * * *